(12) United States Patent
Fritter et al.

(10) Patent No.: US 9,648,845 B2
(45) Date of Patent: May 16, 2017

(54) COMPOSITE ABSORBENT PARTICLES

(71) Applicant: THE CLOROX COMPANY, Oakland, CA (US)

(72) Inventors: Charles F. Fritter, Dublin, CA (US); Ananth N. Shenoy, Alpharetta, GA (US)

(73) Assignee: The Clorox Company, Oakland, CA (US)

( * ) Notice: Subject to any disclaimer, the term of this patent is extended or adjusted under 35 U.S.C. 154(b) by 0 days.

(21) Appl. No.: 14/985,180

(22) Filed: Dec. 30, 2015

(65) Prior Publication Data

US 2016/0113231 A1 Apr. 28, 2016

Related U.S. Application Data

(63) Continuation of application No. 13/758,030, filed on Feb. 4, 2013, now Pat. No. 9,253,961, which is a continuation of application No. 12/032,450, filed on Feb. 15, 2008, now abandoned, which is a continuation of application No. 10/861,044, filed on Jun. 4, 2004, now abandoned, which is a
(Continued)

(51) Int. Cl.
| | |
|---|---|
| *A01K 1/01* | (2006.01) |
| *A01K 1/015* | (2006.01) |
| *B01J 20/28* | (2006.01) |
| *B01J 20/32* | (2006.01) |
| *B01J 20/12* | (2006.01) |
| *B01J 20/20* | (2006.01) |

(52) U.S. Cl.
CPC .......... *A01K 1/0154* (2013.01); *A01K 1/0152* (2013.01); *A01K 1/0155* (2013.01); *B01J 20/12* (2013.01); *B01J 20/20* (2013.01); *B01J 20/2803* (2013.01); *B01J 20/28004* (2013.01); *B01J 20/28016* (2013.01); *B01J 20/28023* (2013.01); *B01J 20/324* (2013.01); *B01J 20/3204* (2013.01); *B01J 20/3295* (2013.01)

(58) Field of Classification Search
CPC ..... B01J 20/20; B01J 20/2803; A01K 1/0152; A01K 1/0154; A01K 1/01
USPC ................................................... 119/171, 173
See application file for complete search history.

(56) References Cited

U.S. PATENT DOCUMENTS

| | | | | |
|---|---|---|---|---|
| 5,538,932 A | * | 7/1996 | Yan ........................ | B01D 53/02 502/424 |
| 5,863,858 A | * | 1/1999 | Miller ..................... | C01B 31/14 502/180 |

(Continued)

Primary Examiner — Yvonne Abbott-Lewis
(74) Attorney, Agent, or Firm — Ann Lee

(57) ABSTRACT

Composite particles and methods for making the same. An absorbent material is formed into a particle. An optional performance-enhancing active is coupled to the absorbent material before, during, or after the particle-forming process, homogeneously and/or in layers. Additionally, the composite absorbent particle may include a core material. Preferred methods for creating the absorbent particles include a pan agglomeration process, a high shear agglomeration process, a low shear agglomeration process, a high pressure agglomeration process, a low pressure agglomeration process, a rotary drum agglomeration process, a mix muller process, a roll press compaction process, a pin mixer process, a batch tumble blending mixer process, an extrusion process, and a fluid bed process.

12 Claims, 7 Drawing Sheets

Related U.S. Application Data continuation-in-part of application No. 10/618,401, filed on Jul. 11, 2003, now abandoned.

(56) References Cited

U.S. PATENT DOCUMENTS

| | | | | |
|---|---|---|---|---|
| 6,472,343 B1* | 10/2002 | McCrae | ............... | B01J 20/20 502/159 |
| 2002/0046710 A1* | 4/2002 | Preti | ............... | A01K 1/01 119/171 |
| 2011/0123474 A1* | 5/2011 | Jenkins | ............... | A61L 9/014 424/76.6 |
| 2011/0253055 A1* | 10/2011 | Tang | ............... | A01K 1/0152 119/173 |
| 2012/0260860 A1* | 10/2012 | Drief | ............... | A01K 1/0154 119/173 |

* cited by examiner

COMPOSITE ABSORBENT PARTICLES

RELATED APPLICATIONS

This application is a continuation of U.S. Ser. No. 13/758,030, filed Feb. 4, 2013 which is a continuation of U.S. Ser. No. 12/032,450, filed Feb. 15, 2008 which is a continuation of U.S. Ser. No. 10/861,044, filed Jun. 4, 2004, which is a continuation-in-part of U.S. patent application entitled "Composite Absorbent Particles" having Ser. No. 10/618,401 filed Jul. 11, 2003 and a continuation-in-part of U.S. patent application entitled "Absorbent Composition with Improved Odor Control" having Ser. No. 10/773,585 filed Feb. 6, 2004, all of which are herein incorporated by reference.

FIELD OF THE INVENTION

The present invention relates to composite absorbent particles, and more particularly, this invention relates to a composite absorbent particle having improved clumping and odor-inhibiting properties.

BACKGROUND OF THE INVENTION

Clay has long been used as a liquid absorbent, and has found particular usefulness as an animal litter.

Because of the growing number of domestic animals used as house pets, there is a need for litters so that animals may micturate, void or otherwise eliminate liquid or solid waste indoors in a controlled location. Many cat litters use clay as an absorbent. Typically, the clay is mined, dried, and crushed to the desired particle size.

Some clay litters have the ability to clump upon wetting. For example, sodium bentonite is a water-swellable clay which, upon contact with moist animal waste, is able to agglomerate with other moistened sodium bentonite clay particles. The moist animal waste is contained by the agglomeration of the moist clay particles into an isolatable clump, which can be removed from the container (e.g., litterbox) housing the litter. However, the clump strength of clay litters described above is typically not strong enough to hold the clump shape upon scooping, and inevitably, pieces of the litter break off of the clump and remain in the litter box, allowing waste therein to create malodors. Further, raw clay typically has a high clump aspect ratio when urinated in. The result is that the wetted portion of clay will often extend to the container containing it and stick to the side or bottom of the container.

What is needed is an absorbent material suitable for use as a cat litter/liquid absorbent that has better clumping characteristics, i.e., clump strength and aspect ratio, than absorbent materials heretofore known.

Another problem inherent in typical litters is the inability to effectively control malodors. Clay has very poor odor-controlling qualities, and inevitably waste build-up leads to severe malodor production. One attempted solution to the malodor problem has been the introduction of granular activated carbon (GAC) into the litter. However, the GAC is usually dry blended with the litter, making the litter undesirably dusty. Also, the GAC concentration must typically be 1% by weight or higher to be effective. Activated carbon is very expensive, and the need for such high concentrations greatly increases production costs. Further, because the clay and GAC particles are merely mixed, the litter will have GAC concentrated in some areas, and particles with no GAC in other areas.

The human objection to odor is not the only reason that it is desirable to reduce odors. Studies have shown that cats are territorial animals and will often "mark" litter that has little or no smell with their personal odor, such as by urinating. When cats return to the litterbox and don't sense their odor, they will try to mark their territory again. The net effect is that cats will return to use a litter box more often if the odor of their markings are reduced. Thus, a litter that is effective at eliminating or hiding a cat's personal odor can encourage the animal to use a litter box rather than depositing waste outside the box.

What is needed is an absorbent material with improved odor-controlling properties, and that maintains such properties for longer periods of time.

What is further needed is an absorbent material with improved odor-control, yet requiring much lower concentrations of odor controlling actives.

What is still further needed is an absorbent material with a lower bulk density while maintaining a high absorbency rate comparable to or exceeding heretofore known materials.

What is also needed is an absorbent material suitable for an animal litter which encourages animals to micturate and void on the absorbent material.

SUMMARY OF THE INVENTION

The present invention provides composite absorbent particles and methods for making the same. An absorbent material is formed into a particle, preferably, by an agglomeration process. An optional performance-enhancing active is coupled to the absorbent material during the agglomeration process, homogeneously and/or in layers. Exemplary actives include antimicrobials, odor absorbers/inhibitors, binders (liquid/solid, silicate, ligninsulfonate, etc.), fragrances, health indicating materials, nonstick release agents, and mixtures thereof. Additionally, the composite absorbent particle may include a core material.

Methods disclosed for creating the absorbent particles include a pan agglomeration process, a high shear agglomeration process, a low shear agglomeration process, a high pressure agglomeration process, a low pressure agglomeration process, a rotary drum agglomeration process, a mix muller process, a roll press compaction process, a pin mixer process, a batch tumble blending mixer process, and an extrusion process. Fluid bed process may also represent a technique for forming the inventive particles.

The processing technology disclosed herein allows the "engineering" of the individual composite particles so that the characteristics of the final product can be predetermined. The composite particles are particularly useful as an animal litter. Favorable characteristics for a litter product such as odor control, active optimization, low density, low tracking, low dust, strong clumping, etc. can be optimized to give the specific performance required. Another aspect of the invention is the use of encapsulated actives, i.e., formed into the particle itself and accessible via pores or discontinuities in the particles. Encapsulation of actives provides a slow release mechanism such that the actives are in a useful form for a longer period of time. A further aspect of the invention provides control over granule strength, and therefore, degradation and/or disintegration properties. Controlling the rate at which granules degrade, for example when the granules disintegrate due to urine deposition, provides another mechanism to slowly release actives from the granule's interior and surface, and in so doing, optimize performance Thus, the present invention's engineered composite particle optimizing the performance enhancing actives is novel in light of the prior art.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODES FOR CARRYING OUT THE INVENTION

The following description includes the best embodiments presently contemplated for carrying out the present invention. This description is made for the purpose of illustrating the general principles of the present invention and is not meant to limit the inventive concepts claimed herein.

The present invention relates generally to composite absorbent particles with improved physical and chemical properties comprising an absorbent material and optional performance-enhancing actives. By using various processes described herein, such particles can be "engineered" to preferentially exhibit specific characteristics including but not limited to improved odor control, lower density, easier scooping, better particle/active consistency, higher clump strength, etc. One of the many benefits of this technology is that the performance-enhancing actives may be positioned to optimally react with target molecules such as but not limited to odor causing volatile substances, resulting in surprising odor control with very low levels of active ingredient.

A preferred use for the absorbent particles is as a cat litter, and therefore much of the discussion herein will refer to cat litter applications. However, it should be kept in mind that the absorbent particles have a multitude of applications, such as air and water filtration, fertilizer, waste remediation, etc., and should not be limited to the context of a cat litter.

One preferred method of forming the absorbent particles is by agglomerating granules of an absorbent material in a pan agglomerator. A preferred pan agglomeration process is set forth in more detail below, but is described generally here to aid the reader. Generally, the granules of absorbent material are added to an angled, rotating pan. A fluid or binder is added to the granules in the pan to cause binding of the granules. As the pan rotates, the granules combine or agglomerate to form particles. Depending on pan angle and pan speed among other factors, the particles tumble out of the agglomerator when they reach a certain size. The particles are then dried and collected.

One or more performance-enhancing actives are preferably added to the particles in an amount effective to perform the desired functionality or provide the desired benefit. For example, these actives can be added during the agglomeration process so that the actives are incorporated into the particle itself, or can be added during a later processing step.

Figure 1:
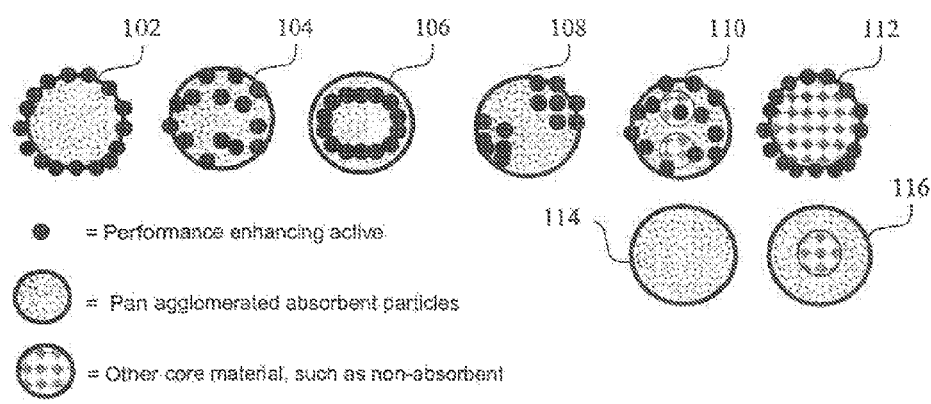
FIG. 1 illustrates several configurations of absorbent composite particles according to various embodiments of the present invention.

FIG. 1 shows several embodiments of the absorbent particles of the present invention. These particles have actives incorporated:

1. In a layer on the surface of a particle (102)
2. Evenly (homogeneously) throughout a composite litter particle (104)
3. In a concentric layer(s) throughout the particle and/or around a core (106)
4. In pockets or pores in and/or around a particle (108)
5. In a particle with single or multiple cores (110)
6. Utilizing non-absorbent cores (112)
7. No actives (114)
8. No actives, but with single or multiple cores (116)
9. In any combination of the above As previously recited hereinabove, other particle-forming processes may be used to form the inventive particles of the present invention. For example, without limitation, extrusion and fluid bed processes appear appropriate. Extrusion process typically involves introducing a solid and a liquid to form a paste or doughy mass, then forcing through a die plate or other sizing means. Because the forcing of a mass through a die can adiabatically produce heat, a cooling jacket or other means of temperature regulation may be necessary. The chemical engineering literature has many examples of extrusion techniques, equipment and materials, such as "Outline of Particle Technology," pp. 1-6 (1999), "Know-How in Extrusion of Plastics (Clays) or NonPlastics (Ceramic Oxides) Raw Materials, pp. 1-2, "Putting Crossflow Filtration to the Test," *Chemical Engineering*, pp. 1-5 (2002), and Brodbeck et al., U.S. Pat. No. 5,269,962, especially col. 18, lines 30-61 thereof, all of which is incorporated herein by reference thereto. Fluid bed process is depicted in Coyne et al., U.S. Pat. No. 5,093,021, especially col. 8, line 65 to col. 9, line 40, incorporated herein by reference.

Materials

Many liquid-absorbing materials may be used without departing from the spirit and scope of the present invention. Illustrative absorbent materials include but are not limited to minerals, fly ash, absorbing pelletized materials, perlite, silicas, other absorbent materials and mixtures thereof. Preferred minerals include: bentonites, zeolites, fullers earth, attapulgite, montmorillonite diatomaceous earth, opaline silica, crystalline silica, silica gel, alumina, Georgia White clay, sepiolite, calcite, dolomite, slate, pumice, tobermite, marls, attapulgite, kaolinite, halloysite, smectite, vermiculite, hectorite, Fuller's earth, fossilized plant materials, expanded perlites, gypsum and other similar minerals and mixtures thereof. The preferred absorbent material is sodium bentonite having a mean particle diameter of about 5000 microns or less, preferably about 3000 microns or less, and ideally in the range of about 25 to about 150 microns.

Because minerals, and particularly clay, are heavy, it is may be desirable to reduce the weight of the composite absorbent particles to reduce shipping costs, reduce the amount of material needed to need to fill the same relative volume of the litter box, and to make the material easier for customers to carry. To lower the weight of each particle, a lightweight core material, or "core," may be incorporated into each particle. The core can be positioned towards the center of the particle with a layer or layers of absorbent and/or active surrounding the core in the form of a shell. This configuration increases the active concentration towards the outside of the particles, making the active more effective. The shell can be of any desirable thickness. In one embodiment with a thin shell, the shell has an average thickness of less than about ½ that of the average diameter of the particle, and preferably the shell has an average thickness of not less than about 1/16 that of the average diameter of the particle. More preferably, the shell has an average thickness of between about 7/16 and ⅛ that of the average diameter of the particle, even more preferably less than about ½ that of the average diameter of the particle, and ideally between about ⅜ and ⅛ that of the average diameter of the particle. Note that these ranges are preferred but not limiting.

According to another embodiment comprising a core and absorbent material surrounding the core in the form of a shell, an average thickness of the shell is at least about four times an average diameter of the core. In another embodiment, an average thickness of the shell is between about 1 and about 4 times an average diameter of the core. In yet another embodiment, an average thickness of the shell is less than an average diameter of the core. In a further embodiment, an average thickness of the shell is less than about one-half an average diameter of the core.

Other ranges can be used, but the thickness of the shell of absorbent material/active surrounding a non-clumping core should be balanced to ensure that good clumping properties are maintained.

In another embodiment, the absorbent material "surrounds" a core (e.g., powder, granules, clumps, etc.) that is dispersed homogeneously throughout the particle or in concentric layers. For example, a lightweight or heavyweight core material can be agglomerated homogeneously into the particle in the same way as the active. The core can be solid, hollow, absorbent, nonabsorbent, and combinations of these.

Exemplary lightweight core materials include but are not limited to calcium bentonite clay, Attapulgite clay, Perlite, Silica, non-absorbent silicious materials, sand, plant seeds, glass, polymeric materials, and mixtures thereof. A preferred material is a calcium bentonite-containing clay which can weigh about half as much as bentonite clay. Calcium bentonite clay is non-clumping so it doesn't stick together in the presence of water, but rather acts as a seed or core. Granules of absorbent material and active stick to these seed particles during the agglomeration process, forming a shell around the seed.

Using the above lightweight materials, a bulk density reduction of ≥10%, ≥20%, preferably ≥30%, more preferably ≥40%, and ideally ≥50% can be achieved relative to generally solid particles of the absorbent material (e.g., as mined) and/or particles without the core material(s). For example, in a particle in which sodium bentonite is the absorbent material, using about 50% of lightweight core of calcium bentonite clay results in about a 42% bulk density reduction.

Heavyweight cores may be used when it is desirable to have heavier particles. Heavy particles may be useful, for example, when the particles are used in an outdoor application in which high winds could blow the particles away from the target zone. Heavier particles also produce an animal litter that is less likely to be tracked out of a litter box. Illustrative heavyweight core materials include but are not limited to sand, iron filings, etc.

Note that the bulk density of the particles can also be adjusted (without use of core material) by manipulating the agglomeration process to increase or decrease pore size, pore volume and surface area of the particle.

Note that active may be added to the core material if desired. Further, the core can be selected to make the litter flushable. One such core material is wood pulp.

Illustrative materials for the performance-enhancing active(s) include but are not limited to antimicrobials, odor absorbers/inhibitors, binders, fragrances, health indicating materials, nonstick release agents, superabsorbent materials, and mixtures thereof. One great advantage of the particles of the present invention is that substantially every absorbent particle contains active.

Preferred antimicrobial actives are boron containing compounds such as borax pentahydrate, borax decahydrate, boric acid, polyborate, tetraboric acid, sodium metaborate, anhydrous, boron components of polymers, and mixtures thereof.

One type of odor absorbing/inhibiting active inhibits the formation of odors. An illustrative material is a water soluble metal salt such as silver, copper, zinc, iron, and aluminum salts and mixtures thereof. Preferred metallic salts are zinc chloride, zinc gluconate, zinc lactate, zinc maleate, zinc salicylate, zinc sulfate, zinc ricinoleate, copper chloride, copper gluconate, and mixtures thereof. Other odor control actives include nanoparticles that may be composed of many different materials such as carbon, metals, metal halides or oxides, or other materials. Additional types of odor absorbing/inhibiting actives include cyclodextrin, zeolites, silicas, activated carbon (also known as activated charcoal), acidic, salt-forming materials, and mixtures thereof. Activated alumina ($Al_2O_3$) has been found to provide odor control comparable and even superior to other odor control additives such as activated carbon, zeolites, and silica gel. Alumina is a white granular material, and is properly called aluminum oxide.

The preferred odor absorbing/inhibiting active is Powdered Activated Carbon (PAC), though Granular Activated Carbon (GAC) can also be used. PAC gives much greater surface area than GAC (GAC is something larger than powder (e.g., ≥80 mesh U.S. Standard Sieve (U.S.S.S.))), and thus has more sites with which to trap odor-causing materials and is therefore more effective. PAC has only rarely been used in absorbent particles, and particularly animal litter, as it tends to segregate out of the litter during shipping, thereby creating excessive dust (also known as "sifting"). By agglomerating PAC into particles, the present invention overcomes the problems with carbon settling out during shipping. Generally, the preferred mean particle diameter of the carbon particles used is less than about 500 microns, but can be larger. The particle size can also be much smaller (less than 100 nanometers) as in the case of carbon nanoparticles. The preferred particle size of the PAC is about 150 microns (~100 mesh U.S.S.S.) or less, and ideally in the range of about 25 to 150 microns, with a mean diameter of about 50 microns (~325 mesh U.S.S.S.) or less.

An active may be added to reduce or even prevent sticking of the litter to the litter box. Useful anti-stick agents include, but are not limited to, hydrophobic materials such as activated carbon, carbon black, Teflon®, hydrophobic polymers and co-polymers, for example poly(propylene oxide).

How tightly swelled litter sticks to a litter box can be measured as a function of the force necessary to remove the 'clump'. One method of measuring this force uses 150 cc of litter and 20 cc of pooled cat urine (from several cats so it is not specific) to form a clump on the bottom of a cat box. The urine causes the litter to clump, and in so doing, the swelled litter adheres to the litter box. The relative amount of force (in pounds) necessary to remove the adhered clump is measured using an Instron tensile tester and a modified scooper.

The data in the table below refer to the following formulas. Formula P is composed of composite particles of the present invention that contain 0.5% PAC as an anti-stick agent. Formula S is a commercially available granular clay litter with no added anti-stick agents.

The data in the table below show that a urine clump formed from the formula composed of composite particles containing 0.5% PAC as an anti-stick agent requires less force for removal from the bottom of a cat box than a urine clump formed from a commercially available granular clay litter containing no anti-stick agents.

TABLE 1

| Litter height Inches | Formula P Removal Force in pounds | Formula S Removal Force in pounds |
| --- | --- | --- |
| 0.5 | 0.17 | 0.63 |
| 0.25 | 0.46 | 0.81 |

Generally, PAC is effective to reduce sticking when present in the composite particles in an amount of 0.1% or more, preferably in the range of about 0.1 to about 1.0%, when compared to composite particles not having the PAC present.

The active may also include a binder such as water, lignin sulfonate (solid), polymeric binders, fibrillated Teflon® (polytetrafluoroethylene or PTFE), and combinations thereof. Useful organic polymerizable binders include, but are not limited to, carboxymethylcellulose (CMC) and its derivatives and its metal salts, guar gum cellulose, xanthan gum, starch, lignin, polyvinyl alcohol, polyacrylic acid, styrene butadiene resins (SBR), and polystyrene acrylic acid resins. Water stable particles can also be made with crosslinked polyester network, including but not limited to those resulting from the reactions of polyacrylic acid or citric acid with different polyols such as glycerin, polyvinyl alcohol, lignin, and hydroxyethylcellulose.

Another active that can be added to the composite particles is a clump enhancing agent that is activated by contact with a liquid to strengthen clumps, thereby assisting in the isolation and encapsulation of the offensive material. Clump enhancing agents are particularly useful when the composite particles are formed of materials that do not have strong inherent clumping capabilities, and where other non-clumping performance enhancing actives are formed on an outer surface of the particles. Preferred clump enhancing agents include binders, gums, starches, and adhesive polymers. The clump enhancing agent is preferably added to outer surfaces of the particles by spraying or by addition during the final stages of agglomeration. Clump enhancing agents can also be bulk-added to the composite particles.

Dedusting agents can also be added to the particles in order to reduce the dust level in the final product. All of the clump enhancing agents listed above are effective dedusting agents when applied to the outer surface of the composite absorbent particles. Other dedusting agents include but are not limited to fibrillated Teflon, resins, water, and other liquid or liquefiable materials.

A color altering agent such as a dye, pigmented polymer, metallic paint, bleach, lightener, etc. may be added to vary the color of absorbent particles, such as to darken or lighten the color of all or parts of the litter so it is more appealing. Preferably, the color altering agent comprises up to approximately 20% of the absorbent composition, more preferably, 0.001%-5% of the composition. Even more preferably, the color altering agent comprises approximately 0.001%-0.1% of the composition.

Preferred carriers for the color altering agent are zeolites, carbon, charcoal, etc. These substrates can be dyed, painted, coated with powdered colorant, etc.

Activated alumina and activated carbon may include an embedded coloring agent that has been added during the fabrication of the activated alumina or activated carbon particles to form a colored speckle. The inventors have found that the odor absorbing properties of activated alumina and activated carbon are not significantly reduced due to the application of color altering agents thereto.

Additionally, activated alumina's natural white coloring makes it a desirable choice as a white, painted or dyed "speckle" in litters. In composite and other particles, the activated alumina can also be added in an amount sufficient to lighten or otherwise alter the overall color of the particle or the overall color of the entire composition.

Compositions may also contain colored speckles for visual appeal. Other examples of speckle material are salt crystals or gypsum crystals.

Large particles of carbon, e.g., activated carbon or charcoal, can also be used as a dark speckle. Such particles are preferably within a particle diameter size range of about 0.01 to 10 times the mean diameter of the other particles in the mixture.

Suitable superabsorbent materials include superabsorbent polymers such as AN905SH, FA920SH, and FO4490SH, all from Floerger. Preferably, the superabsorbent material can absorb at least 5 times its weight of water, and ideally more than 10 times its weight of water.

The core mentioned above can also be considered an active, for example including a lightweight material dispersed throughout the particle to reduce the weight of the particle, a core made of pH-altering material, etc. A preferred embodiment is to bind actives directly to the surface of composite absorbent particles. The use of extremely low levels of actives bound only to the surface of absorbent particles leads to the following benefits:
1. the use of extremely small particle size of the active material results in a very high surface area of active while using a very small amount of active,
2. with actives present only on the surface of the substrate, the waste of expensive actives that would be found with 'homogeneous' composite particles [where actives are found throughout the substrate particles] is eliminated,
3. segregation of actives from substrates is eliminated; thus, the actives remain dispersed and do not end up on the bottom of the litter container,
4. by using very low levels of expensive actives, the cost of the product is greatly reduced,
5. binding of small particle size actives directly to the substrate surface results in lower dust levels than in bulk added product.

Surprisingly, low levels of PAC 0.2-0.3% have been found to provide excellent odor control in cat litter when they are bound to the surface of a material such as sodium bentonite clay. For example, binding of small amounts of PAC particles to sodium bentonite substrate particles using xanthan gum or fibrillatable PTFE as binder results in litter materials with superior odor adsorbing performance. In this example, the PAC is highly effective at capturing malodorous volatile organic compounds as they escape from solid and liquid wastes due to the high surface area of the PAC, and its preferred location on the surface of the sodium bentonite particles.

Another aspect of the invention is the use of Encapsulated Actives, where the actives are positioned inside the particle, homogeneously and/or in layers. Because of the porous structure of the particles, even actives positioned towards the center of the particle are available to provide their particular functionality. In addition, as previously mentioned, controlled degradation of the composite particles can result in controlled release of encapsulated actives. Encapsulation of actives provides a slow release mechanism such that the actives are in a useful form for a longer period of time. This is particularly so where the active is used to reduce malodors, control or kill germs, reduce sticking to the box, enhance clump strength, or as an indicator of health.

Pan Agglomeration and Other Particle Creation Processes

The agglomeration process in combination with the unique materials used allows the manufacturer to control the physical properties of particles, such as bulk density, dust, strength, as well as PSD (particle size distribution) without changing the fundamental composition and properties of absorbent particles.

One benefit of the pan agglomeration process of the present invention is targeted active delivery, i.e., the position of the active can be "targeted" to specific areas in, on, and/or throughout the particles. Another benefit is that because the way the absorbent particles are formed is controllable, additional benefits can be "engineered" into the absorbent particles, as set forth in more detail below.

Figure 2:
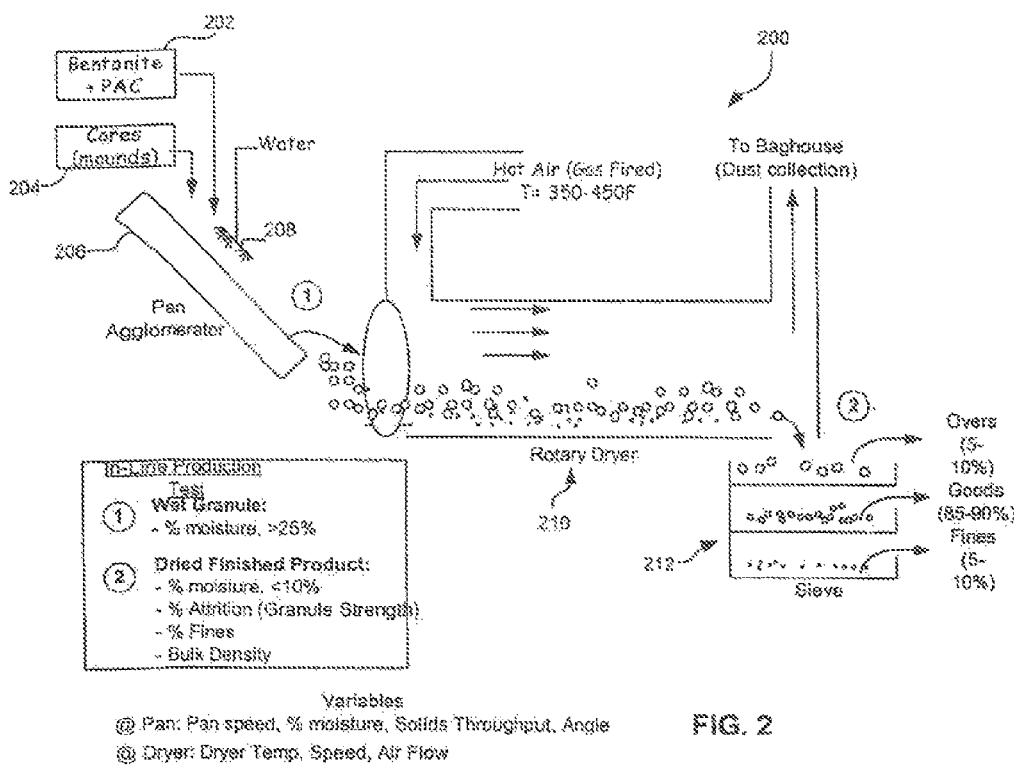
FIG. 2 is a process diagram illustrating a pan agglomeration process according to a preferred embodiment.

FIG. 2 is a process diagram illustrating a pan agglomeration process 200 according to a preferred embodiment. In this example, the absorbent granules are bentonite clay and the active is PAC. Cores of a suitable material, here calcium bentonite clay, are also added. The absorbent particles (e.g., bentonite powder) is mixed with the active (e.g., PAC) to form a dry mixture, which is stored in a hopper 202 from which the mixture is fed into the agglomerator 206. Alternatively, the absorbent granules and active(s) may be fed to the agglomerator individually. For example, liquid actives can be added by a sprayer. The cores are preferably stored in another hopper 204, from which they are fed into the agglomerator. A feed curtain can be used to feed the various materials to the agglomerator.

Figure 3:
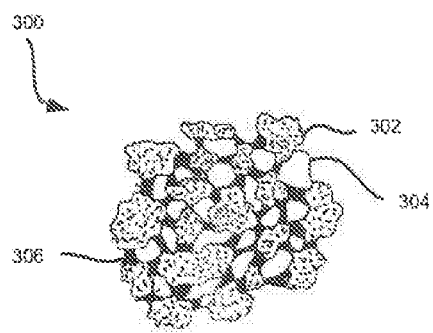
FIG. 3 depicts the structure of an illustrative agglomerated composite particle formed by the process of FIG. 2.

In this example, the agglomerator is a pan agglomerator. The pan agglomerator rotates at a set or variable speed about an axis that is angled from the vertical. Water and/or binder is sprayed onto the granules in the agglomerator via sprayers 208 to raise/maintain the moisture content of the particles at a desired level so that they stick together. Bentonite acts as its own binder when wetted, causing it to clump, and so additional binder is not be necessary. The pan agglomeration process gently forms composite particles through a snowballing effect broadly classified by experts as natural or tumble growth agglomeration. FIG. 3 depicts the structure of an illustrative agglomerated composite particle 300 formed during the process of FIG. 2. As shown, the particle includes granules of absorbent material 302 and active 304 with moisture 306 or binder positioned interstitially between the granules.

Depending on the pan angle and pan speed, the particles tumble off upon reaching a certain size. Thus, the pan angle and speed controls how big the particles get. The particles are captured as they tumble from the agglomerator. The particles are then dried to a desired moisture level by any suitable mechanism, such as a rotary or fluid bed. In this example, a forced air rotary dryer 210 is used to lower the high moisture content of the particles to less than about 15% by weight and ideally about 8-13% by weight. At the outlet of the rotary dryer, the particles are screened with sieves 212 or other suitable mechanism to separate out the particles of the desired size range. Tests have shown that about 80% or more of the particles produced by pan agglomeration will be in the desired particle size range. Preferably, the yield of particles in the desired size range is 85% or above, and ideally 90% or higher. The selected particle size range can be in the range of about 10 mm to about 100 microns, and preferably about 2.5 mm or less. An illustrative desired particle size range is 12×40 mesh (1650-400 microns).

The exhaust from the dryer is sent to a baghouse for dust collection. Additional actives such as borax and fragrance can be added to the particles at any point in the process before, during and/or after agglomeration. Also, additional/different actives can be dry blended with the particles.

Illustrative composite absorbent particles after drying have a specific weight of from about 0.15 to about 1.2 kilograms per liter and a liquid absorbing capability of from about 0.6 to about 2.5 liters of water per kilogram of particles. Preferably, the particles absorb about 50% or more of their weight in moisture, more preferably about 75% or more of their weight in moisture, even more preferably greater than approximately 80% and ideally about 90% or more of their weight in moisture.

Specific examples of compositions that can be fed to the agglomerator using the process of FIG. 2 include (in addition to effective amounts of active):

100% Bentonite Powder
    67% Calcium Bentonite Clay (core) & 33% Bentonite Powder
    50% Calcium Bentonite Clay (core) & 50% Bentonite Powder
    Perlite (core) & Bentonite Powder
    Sand (core) & Bentonite Powder The following table lists illustrative properties for various compositions of particles created by a 20" pan agglomerator at pan angles of 40-60 degrees and pan speeds of 20-50 RPM. The total solids flow rates into the pan were 0.2-1.0 kg/min

TABLE 2

| Core | Water | Bentonite to Core Ratio | Final Moisture | Bulk Density (kg/l) | Clump Strength |
|---|---|---|---|---|---|
| None | 15-23% | 100:0 | 1.0-1.4% | 0.70-0.78 | 95-97 |
| Calcium bentonite | 15-23 | 50:50 | 3.4 | 0.60-0.66 | 95-97 |
| Calcium bentonite | 15-18 | 33:67 | 4.3-4.4 | 0.57-0.60 | 93-95 |
| Sand | 10-12 | 50:50 | 2.0 | 0.81-0.85 | 97-98 |
| Sand | 6-8 | 33:67 | 1.6-2.4 | 0.92 | 97 |
| Perlite | 15-19% | 84:16 | | 0.36-0.39 | 97% |
| Perlite | 16-23% | 76:24 | | 0.27-0.28 | 95-97% |

Clump strength is measured by first generating a clump by pouring 10 ml of pooled cat urine (from several cats so it is not cat specific) onto a 2 inch thick layer of litter. The urine causes the litter to clump. The clump is then placed on a ½" screen after a predetermined amount of time (e.g., 6 hours) has passed since the particles were wetted. The screen is agitated for 5 seconds with the arm up using a Ro-Tap Mechanical Sieve Shaker made by W.S. Tyler, Inc. The percentage of particles retained in the clump is calculated by dividing the weight of the clump after agitation by the weight of the clump before agitation. Referring again to the table above, note that the clump strength indicates the percentage of particles retained in the clump after 6 hours. As shown, >90%, and more ideally, >95% of the particles are retained in a clump after 6 hours upon addition of an aqueous solution, such as deionized water or animal urine.

Note that ≥ about 80% particle retention in the clump is preferred. Also, note the reduction in bulk density when a core of calcium bentonite clay or perlite is used.

Figure 4:
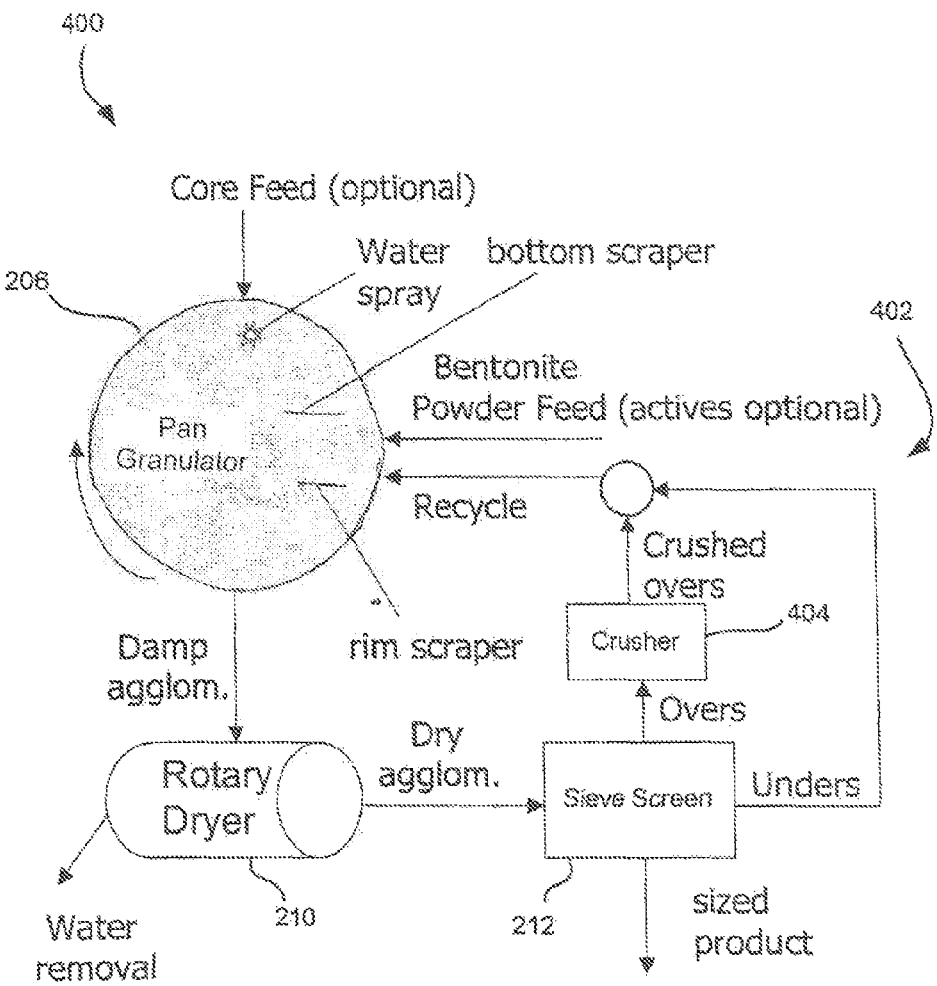
FIG. 4 is a process diagram illustrating another exemplary pan agglomeration process with a recycle subsystem.

FIG. 4 is a process diagram illustrating another exemplary pan agglomeration process 400 with a recycle subsystem 402. Save for the recycle subsystem, the system of FIG. 4 functions substantially the same as described above with respect to FIG. 2. As shown in FIG. 4, particles under the desired size are sent back to the agglomerator. Particles over the desired size are crushed in a crusher 404 and returned to the agglomerator.

The diverse types of clays and mediums that can be utilized to create absorbent particles should not be limited to those cited above. Further, unit operations used to develop these particles include but should not be limited to: high shear agglomeration processes, low shear agglomeration processes, high pressure agglomeration processes, low pressure agglomeration processes, mix mullers, roll press compacters, pin mixers, batch tumble blending mixers (with or without liquid addition), and rotary drum agglomerators. For simplicity, however, the larger portion of this description shall refer to the pan agglomeration process, it being understood that other processes could potentially be utilized with similar results.

Figure 5:
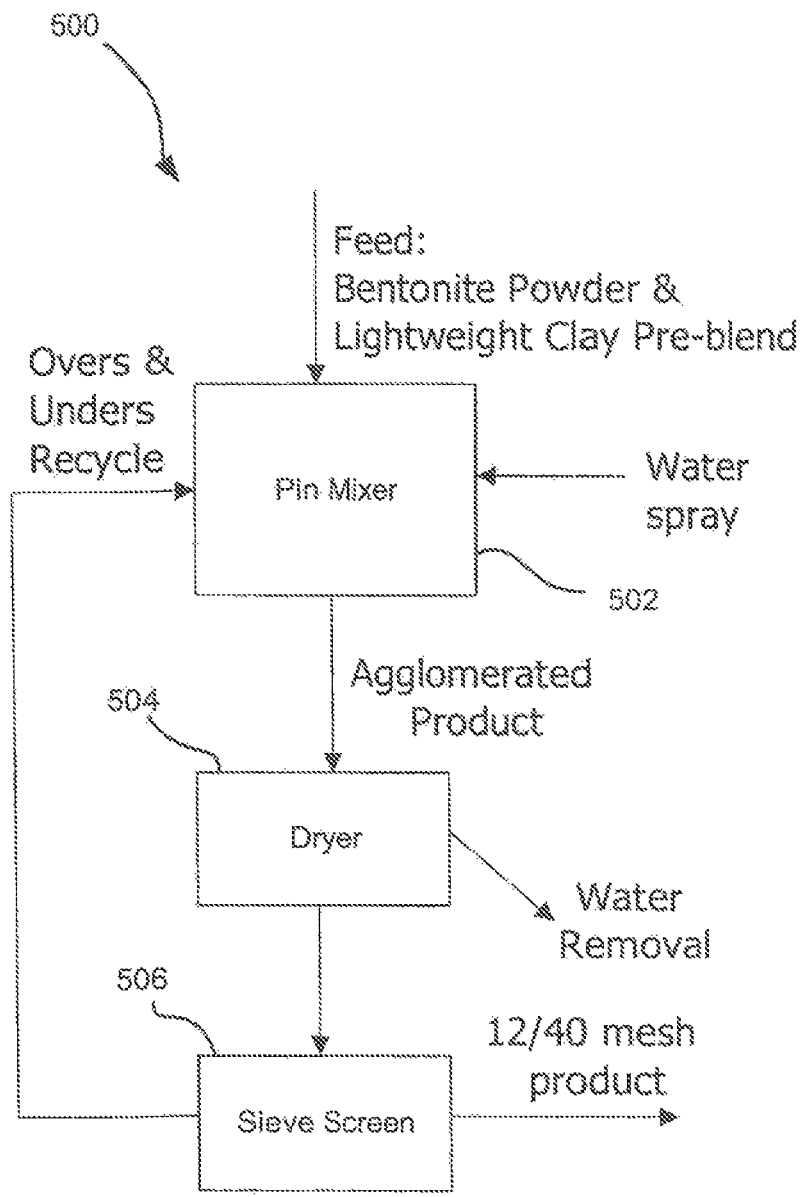
FIG. 5 is a process diagram illustrating an exemplary pin mixer process for forming composite absorbent particles.

FIG. 5 is a process diagram illustrating an exemplary pin mixer process 500 for forming composite absorbent particles. As shown, absorbent particles and active are fed to a pin mixer 502. Water is also sprayed into the mixer. The agglomerated particles are then dried in a dryer 504 and sorted by size in a sieve screen system 506. The following table lists illustrative properties for various compositions of particles created by pin mixing.

TABLE 3

| Lightweight Clay | Bentonite to Clay Ratio (wt %) | Water Addition (wt %) | Bulk Density (lb/ft$^3$) | Clump Strength –6 hours (% Retained) |
|---|---|---|---|---|
| Zeolite (39 lb/ft$^3$) | 50:50 | 20 | 59 | 91 |
| Bentonite (64 lb/ft$^3$) | 100:0 | 20 | 67 | 95 |

Figure 6:
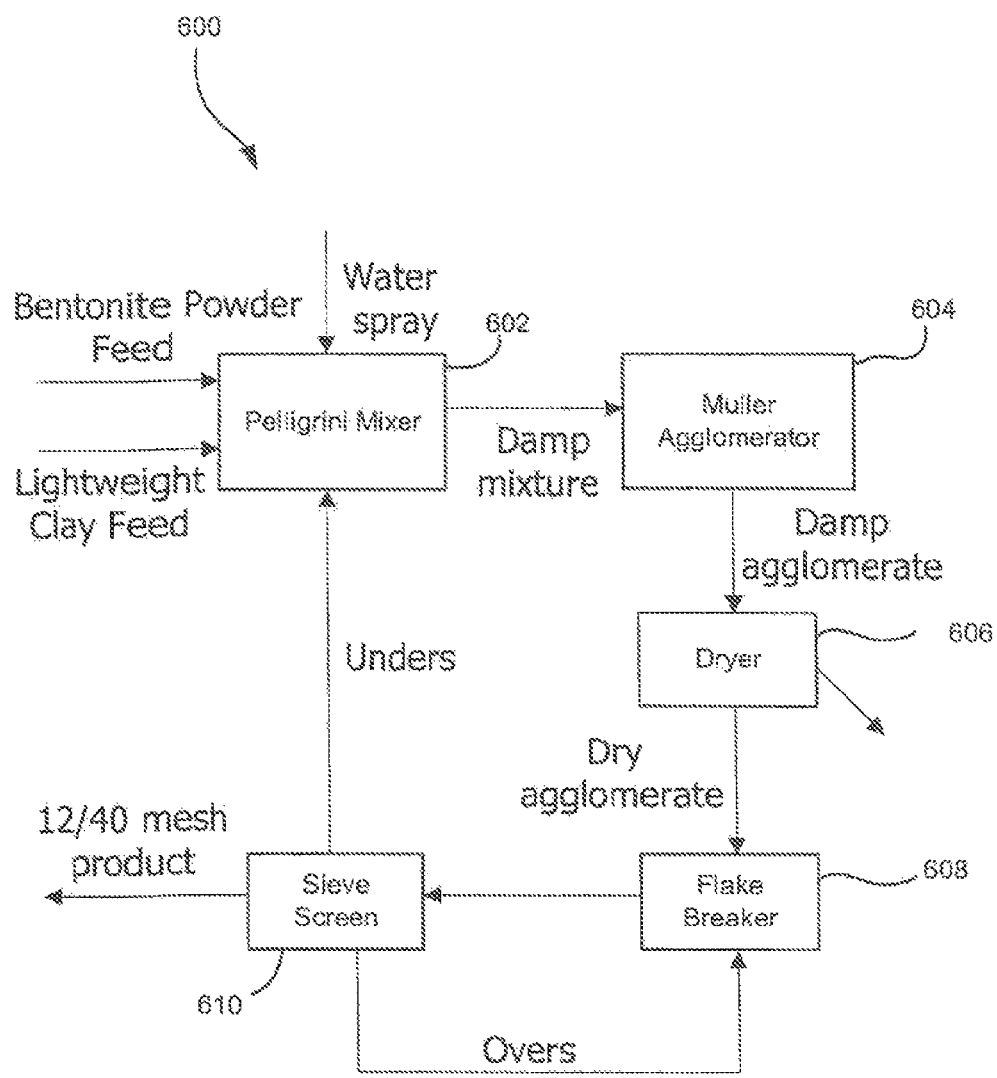
FIG. 6 is a process diagram illustrating an exemplary mix muller process for forming composite absorbent particles.

FIG. 6 is a process diagram illustrating an exemplary mix muller process 600 for forming composite absorbent particles. As shown, the various components and water and/or binder are added to a pellegrini mixer 602. The damp mixture is sent to a muller agglomerator 604 where the mixture is agglomerated. The agglomerated particles are dried in a dryer 606, processed in a flake breaker 608, and then sorted by size in a sieve screen system 610.

The following table lists illustrative properties for various compositions of particles created by a muller process. Note that the moisture content of samples after drying is 2-6 weight percent.

The composite absorbent particle can be formed into any desired shape. For example, the particles are substantially spherical in shape when they leave the agglomeration pan. At this point, i.e., prior to drying, the particles have a high enough moisture content that they are malleable. By molding, compaction, or other processes known in the art, the composite absorbent particle can be made into non-spherical shapes such as, for example, ovals, flattened spheres, hexagons, triangles, squares, etc. and combinations thereof.

Example 1

Referring again to FIG. 1, a method for making particles 102 is generally performed using a pan agglomeration process in which clay particles of ≤200 mesh (≤74 microns), preferably ≤325 mesh (≤43 microns) particle size premixed with particles of active, are agglomerated in the presence of an aqueous solution to form particles in the size range of about 12×40 mesh (about 1650-250 microns). Alternatively, the particles are first formed with clay alone, then reintroduced into the pan or tumbler, and the active is added to the pan or tumbler, and a batch run is performed in the presence of water or a binder to adhere the active to the surface of the particles. Alternatively, the active can be sprayed onto the particles.

Example 2

A method for making particles 104 is generally performed using the process described with relation to FIG. 2, except no core material is added.

Example 3

A method for making particles 106 is generally performed using the process described with relation to FIG. 2, except that introduction of the absorbent granules and the active into the agglomerator are alternated to form layers of each.

Example 4

A method for making particles 108 is generally performed using the process described with relation to FIG. 2, except that the active has been pre-clumped using a binder, and the clumps of active are added. Alternatively, particles of absorbent material can be created by agglomeration and spotted with a binder such that upon tumbling with an active, the active sticks to the spots of binder thereby forming concentrated areas. Yet another alternative includes the process of pressing clumps of active into the absorptive material.

TABLE 4

| Clay | Bentonite:Clay (wt %) | Water Addition (wt %) | Calculated Bulk Density (lb/ft$^3$) | Actual Bulk Density (lb/ft$^3$) | Clump Strength - 6 hours (% Retained) | Dust (mg) |
|---|---|---|---|---|---|---|
| GWC (32 lb/ft$^3$) | 50:50 | 33 | 43 | 45 | 83 | 39 |
| GWC (32 lb/ft$^3$) | 50:50 | 47 | 43 | 42 | 56 | 34 |
| Taft DE (22 lb/ft$^3$) | 50:50 | 29 | 33 | 46 | 86 | 38 |
| Taft DE (22 lb/ft$^3$) | 50:50 | 41 | 33 | 43 | 76 | 35 |

Example 5

A method for making particles 110 is generally performed using the process described with relation to FIG. 2.

Example 6

A method for making particles 112 is generally performed using the process described with relation to FIG. 2.

Example 7 & 8

A method for making particles 114 and 116 are generally performed using the process described with relation to FIG. 2, except no active is added.

In addition, the performance-enhancing active can be physically dispersed along pores of the particle by suspending an insoluble active in a slurry and spraying the slurry onto the particles. The suspension travels into the pores and discontinuities, depositing the active therein.

Control Over Particle Properties

Strategically controlling process and formulation variables along with agglomerate particle size distribution allows for the development of various composite particles engineered specifically to enable attribute improvements as needed. Pan agglomeration process variables include but are not limited to raw material and ingredient delivery methods, solid to process water mass ratio, pan speed, pan angle, scraper type and configuration, pan dimensions, throughput, and equipment selection. Formulation variables include but are not limited to raw material specifications, raw material or ingredient selection (actives, binders, clays and other solids media, and liquids), formulation of liquid solution used by the agglomeration process, and levels of these ingredients.

The pan agglomeration process intrinsically produces agglomerates with a narrow particle size distribution (PSD). The PSD of the agglomerates can be broadened by utilizing a pan agglomerator that continuously changes angle (pivots back and forth) during the agglomeration process. For instance, during the process, the pan could continuously switch from one angle, to a shallower angle, and back to the initial angle or from one angle, to a steeper angle, and back to the initial angle. This variable angle process would then repeat in a continuous fashion. The angles and rate at which the pan continuously varies can be specified to meet the operator's desired PSD and other desired attributes of the agglomerates.

As mentioned above, the agglomeration process can be manipulated to control process and formulation variables. This manipulation can be used, for example, to increase or decrease pore size, pore volume and surface area which can then result in control of bulk properties such as the bulk density of the particles (with or without use of core material), the overall liquid absorption capacity by the particles, and the rate of degradation of formed granules under swelling conditions. The pore size, pore volume, surface area and resulting bulk properties depend primarily on the pan angle and the pan speed, which together create an effective pressure on the particles being agglomerated into composite particles. By increasing the pan speed, the centrifugal force exerted on the particles is increased, thereby reducing the internal pore size of the resulting composite particles. Similarly, as the pan angle is increased from the horizontal, the particles will tumble more violently towards the bottom of the pan, again reducing the internal pore size of the resulting composite particles.

A larger pore size results in a lower overall bulk density of the composite particles. A larger pore size also allows odoriferous molecules to more readily reach actives embedded within the composite particles. The pore size also affects hydraulic conductivity.

By knowledge of interactions between pan, dryer, and formulation parameters one could further optimize process control or formulation/processing cost. For example, it was noted that by addition of a minor content of a less absorptive clay, we enabled easier process control of particle size. For example, by addition of calcium bentonite clay the process became much less sensitive to process upsets and maintains consistent yields in particle size throughout normal moisture variation. Addition of calcium bentonite clay also helped reduce particle size even when higher moisture levels were used to improve granule strength. This is of clear benefit as one looks at enhancing yields and having greater control over particle size minimizing need for costly control equipment or monitoring tools.

For those practicing the invention, pan agglomeration manipulation and scale-up can be achieved through an empirical relationship describing the particle's path in the pan. Process factors that impact the path the particle travels in the pan include but are not limited to pan dimensions, pan speed, pan angle, input feed rate, solids to process liquid mass ratio, spray pattern of process liquid spray, position of scrapers, properties of solids being processed, and equipment selection. Additional factors that may be considered when using pan agglomerators include particle to particle interactions in the pan, gravity effects, and the following properties of the particles in the pan: distance traveled, shape of the path traveled, momentum, rotational spin about axis, shape, surface properties, and heat and mass transfer properties.

The composite particles provide meaningful benefits, particularly when used as a cat litter, that include but are not limited to improvements in final product attributes such as odor control, litter box maintenance benefits, reduced dusting or sifting, and consumer convenience. As such, the following paragraphs shall discuss the composite absorbent particles in the context of animal litter, it being understood that the concepts described therein apply to all embodiments of the absorbent particles.

Significant odor control improvements over current commercial litter formulas have been identified for, but are not limited to, the following areas:

Fecal odor control (malodor source: feline feces)
Ammonia odor control (malodor source: feline urine)
Non-ammonia odor control (malodor source: feline urine)

Odor control actives that can be utilized to achieve these benefits include but are not limited to powdered activated carbon, silica powder (Type C), borax pentahydrate, and bentonite powder. The odor control actives are preferably distributed within and throughout the agglomerates by pre-blending the actives in a batch mixer with clay bases and other media prior to the agglomeration step. The pan agglomeration process, in conjunction with other unit operations described here, allows for the targeted delivery of actives within and throughout the agglomerate, in the outer volume of the agglomerate with a rigid core, on the exterior of the agglomerate, etc. These or any targeted active delivery options could also be performed in the pan agglomeration process exclusively through novel approaches that include, but should not be limited to, strategic feed and water spray locations, time delayed feeders and spray systems, raw material selection and their corresponding levels in the product's formula (actives, binders, clays, and other medium), and critical pan agglomeration process variables described herein.

Additionally, the pan agglomeration process allows for the incorporation of actives inside each agglomerate or granule by methods including but not limited to dissolving, dispersing, or suspending the active in the liquid solution used in the agglomeration process. As the pan agglomeration process builds the granules from the inside out, the actives in the process's liquid solution become encapsulated inside each and every granule. This approach delivers benefits that include but should not be limited to reduced or eliminated segregation of actives from base during shipping or handling (versus current processes that simply dry tumble blend solid actives with solid clays and medium), reduced variability in product performance due to less segregation of actives, more uniform active dispersion across final product, improved active performance, and more efficient use of actives. This more effective use of actives reduces the concentration of active required for the active to be effective, which in turn allows addition of costly ingredients that would have been impractical under prior methods. For example, dye or pigment can be added to vary the color of the litter, lighten the color of the litter, etc. Disinfectant can also be added to kill germs. For example, this novel approach can be utilized by dissolving borax pentahydrate in water. This allows the urease inhibitor (boron) to be located within each granule to provide ammonia odor control and other benefits described here. One can strategically select the proper actives and their concentrations in the liquid solution used in the process to control the final amount of active available in each granule of the product or in the product on a bulk basis to deliver the benefits desired.

Targeted active delivery methods should not be limited to the targeted active delivery options described here or to odor control actives exclusively. For example, another class of active that could utilize this technology is animal health indicating actives such as a pH indicator that changes color when urinated upon, thereby indicating a health issue with the animal. This technology should not be limited to cat litter applications. Other potential industrial applications of this technology include but should not be limited to laundry, home care, water filtration, fertilizer, iron ore pelletizing, pharmaceutical, agriculture, waste and landfill remediation, and insecticide applications. Such applications can utilize the aforementioned unit operations like pan agglomeration and the novel process technologies described here to deliver smart time-releasing actives or other types of actives and ingredients in a strategic manner. The targeted active delivery approach delivers benefits that include but should not be limited to the cost efficient use of actives, improvements in active performance, timely activation of actives where needed, and improvements in the consumer perceivable color of the active in the final product. One can strategically choose combinations of ingredients and targeted active delivery methods to maximize the performance of actives in final products such as those described here.

Litter box maintenance improvements can be attributed to proper control of the product's physical characteristics such as bulk density, clump strength, attrition or durability (granule strength), clump height (reduction in clump height has been found to correlate to reduced sticking of litter to the bottom of litter box), airborne and visual dust, lightweight, absorption (higher absorption correlates to less sticking to litter box—bottom, sides, and corners), adsorption, ease of scooping, ease of carrying and handling product, and similar attributes. Strategically controlling process and formulation variables along with agglomerate particle size distribution allows for the development of various cat litter particles engineered specifically to "dial in" attribute improvements as needed. Pan agglomeration process variables include but are not limited to raw material and ingredient delivery methods, solid to process water mass ratio, pan speed, pan angle, scraper type and configuration, pan dimensions, throughput, and equipment selection. Formulation variables include but are not limited to raw material specifications, raw material or ingredient selection (actives, binders, clays and other solids medium, and liquids), formulation of liquid solution used by the agglomeration process, and levels of these ingredients. For example, calcium bentonite can be added to reduce sticking to the box.

Improvements in consumer convenience attributes include but are not limited to those described here and have been linked to physical characteristics of the product such as bulk density or light weight. Because the absorbent particles are made from small granules, the pan agglomeration process creates agglomerated particles having a porous structure that causes the bulk density of the agglomerates to be lower than its initial particulate form. Further, by adjusting the rotation speed of the pan, porosity can be adjusted. In particular, a faster pan rotation speed reduces the porosity by compressing the particles. Since consumers use products like cat litter on a volume basis, the pan agglomeration process allows the manufacturer to deliver bentonite based cat litters at lower package weights but with equivalent volumes to current commercial litters that use heavier clays that are simply mined, dried, and sized. The agglomerates' reduced bulk density also contributes to business improvements previously described such as cost savings, improved logistics, raw material conservation, and other efficiencies. Lightweight benefits can also be enhanced by incorporating cores that are lightweight. A preferred bulk density of a lightweight litter according to the present invention is less than about 1.5 grams per cubic centimeter and more preferably less than about 0.85 g/cc. Even more preferably, the bulk density of a lightweight litter according to the present invention is between about 0.25 and 0.85 g/cc, and ideally for an animal litter 0.35 and 0.50 g/cc.

The porous structure of the particles also provides other benefits. The voids and pores in the particle allow access to active positioned towards the center of the particle. This increased availability of active significantly reduces the amount of active required to be effective. For example, in particles in which carbon is incorporated in layers or heterogeneously throughout the particle, the porous structure of the absorbent particles makes the carbon in the center of the particle available to control odors. Many odors are typically in the gas phase, so odorous molecules will travel into the pores, where they are adsorbed onto the carbon. By mixing carbon throughout the particles, the odor-absorbing life of the particles is also increased. This is due to the fact that the agglomeration process allows the manufacturer to control the porosity of particle, making active towards the center of the particle available.

Figure 7:
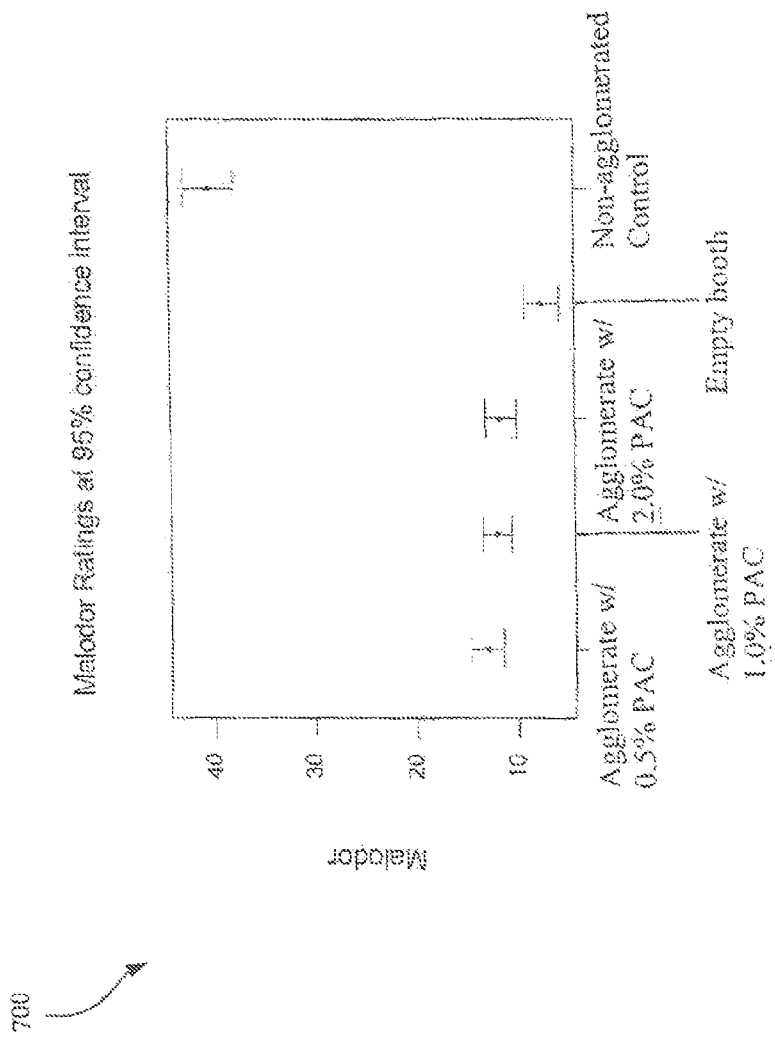
FIG. 7 is a graph depicting malodor ratings.

Because of the unique processing of the absorbent particles of the present invention, substantially every absorbent particle contains carbon. As discussed above, other methods merely mix GAC with clay, and compress the mixture into particles, resulting in aggregation and some particles without any carbon. Thus, more carbon must be added. Again, because of the way the particles are formed and the materials used (small clay granules and PAC), lower levels of carbon are required to effectively control odors. In general, the carbon is present in the amount of 5% or less based on the weight of the particle. In illustrative embodiments, the carbon is present in the amount of 1.0% or less, 0.5% or less, and 0.3% or less, based on the weight of the particle. In other embodiments, activated alumina is present in the amount of 1.0% or less, 0.5% or less, and 0.3% or less, based on the weight of the particle. This lower amount of carbon or other odor controlling additive significantly lowers the cost for the particles, as these additives are very expensive compared to clay. The amount of carbon or other odor controlling additive required to be effective is further reduced because the agglomeration process incorporates the carbon into each particle, using it more effectively. As shown in the graph 700 of FIG. 7, the composite absorbent particles according to a preferred embodiment have a malodor rating below about 15, whereas the non-agglomerated control has a rating of about 40, as determined by a Malodor Sensory Method.

Description of Malodor Sensory Method:
1. Cat boxes are filled with 2,500 cc of test litter.
2. Boxes are dosed each morning for four days with 30 g of pooled feces.
3. On the fourth day the center of each box is dosed with 20 ml pooled urine.
4. The boxes are placed into sensory evaluation booths.
5. The boxes are allowed to equilibrate in the closed booths for 30-45 minutes before panelist evaluation.
6. The samples are then rated on a 60 point line scale by trained panelists.

Preferably, the agglomerated particles exhibit noticeably less odor after four days from contamination with animal waste as compared to a generally solid particle of the absorbent material alone under substantially similar conditions.

As mentioned above, the human objection to odor is not the only reason that it is desirable to reduce odors. Studies have shown that cats prefer litter with little or no smell. One theory is that cats like to mark their territory by urinating. When cats return to the litterbox and don't sense their odor, they will try to mark their territory again. The net effect is that cats return to use the litter box more often if the odor of their markings is reduced.

Accordingly, the composite particles induce a cat to use the litter, and thus provide a mechanism to defeat a cat's instinct to mark its territory in areas other than the litter box.

A preferred embodiment of the present invention has a feline inducement to use index of at least 8, and ideally at least 9, as measured by the following test.

Description of Feline Inducement to Use Index Test:
1. Cat boxes are filled with 2,500 cc of test litter of >95% bentonite, ~1% activated carbon, and may include other optional actives. The cat boxes are each placed in an individual cage having a floor area of 12 square feet.
2. One cat is placed in each cage and kept there for seven days. The excrement and urine are not removed from the litter.
3. On the seventh day the cage is examined for urine and excrement in areas other than the box.
4. The number of soiled areas of the cage other than the box are enumerated and subtracted from a base number of 10 to produce individual indices. The individual indices are averaged by the total number of cat boxes in the test to determine the feline inducement to use index.

Additionally, in households with multiple cats, one or both cats may object to sharing the litterbox upon sensing the odor of the other cat's waste. However, the superior odor control properties of the composite particles described herein have been found to sufficiently control odors that multiple cats use litter even after an extended period of time.

A preferred embodiment of the present invention has a multiple cat usage index of at least 8, and ideally at least 9, as measured by the following test.

Description of Multiple Cat Usage Index Test:
1. Cat boxes are filled with 2,500 cc of test litter of >95% bentonite, ~1% activated carbon, ~1% of a boron compound sprayed onto the particles, and optionally additional actives. The cat boxes are each placed in an individual cage having a floor area of 12 square feet.
2. Two cats are placed in each cage and kept there for seven days. The excrement and urine are not removed from the litter.
3. On the seventh day the cage is examined for urine and excrement in areas other than the box.
4. The number of soiled areas of the cage other than the box are enumerated and subtracted from a base number of 10 to produce individual indices. The individual indices are averaged by the total number of cat boxes in the test to determine the multiple cat usage index.

The composite absorbent particles of the present invention exhibit surprising additional features heretofore unknown. The agglomerated composite particles allow specific engineering of the particle size distribution and density, and thereby the clump aspect ratio. Thus, hydraulic conductivity (K) values of ≤0.25 cm/s as measured by the following method can be predicted using the technology disclosed herein, resulting in a litter that prevents seepage of urine to the bottom of the box when sufficient litter is present in the box.

Method for measuring Hydraulic Conductivity
Materials:
1. Water-tight gas drying tube with 7.5 centimeter diameter
2. Manometer
3. Stop watch
4. 250 ml graduated cylinder Procedure:
1. Mix and weigh sample
2. Pour the sample into the Drying tube until the total height of the sample is 14.6 centimeters.
3. Close the cell.
4. Use vacuum to pull air through and dry the sample for at least 3 minutes.
5. When the sample is dry, saturate the sample slowly with water by opening the inlet valve.
6. Allow the water exiting the drying tube to fill the graduated cylinder.
7. Deair the system using vacuum, allowing the system to stabilize for 10 minutes.
8. After 10 minutes, record the differential pressure as displayed by the manometer.
9. Record at least 4 differential pressure measurements, waiting 3 minutes between each measurement.
10. Record the flow rate of the water entering the graduated cylinder.
11. Calculate the Hydraulic Conductivity, K, using Darcy's Law $$Q = -KA(h_a - h_b)/L$$

Q=Flow Rate
K=Hydraulic Conductivity
A=Cross Sectional Area
L=Bed Length
Ha−Hb=Differential Pressure One of the distinguishing characteristics of the optimum K value is a litter clump with a very low height to length ratio (flat). By controlling the particle size of the litter, clump strength and clump profile can be controlled. This is important because the smaller the clumps are, the less likely they are to stick to something like the animal or litterbox. For instance, with prior art compacted litter, if a cat urinates 1 inch from the side of the box, the urine will penetrate to the side of box and the clay will stick to the box. However, the present invention allows the litter particles to be engineered so urine only penetrates about ½ inch into a mass of the particles.

Agglomerated composite particles according to the present invention also exhibit interesting clumping action not previously seen in the literature. Particularly, the particles exhibit extraordinary clump strength with less sticking to the box, especially in composite particles containing bentonite and PAC. PAC is believed to act as a release agent to reduce sticking to the box. However, intuitively this should also lead to reduced clump strength, not increased clump strength. The combination of stronger clumps yet exhibiting less sticking to the box is both surprising and counter-intuitive. The result is a litter with multiple consumer benefits including strong clumps, low urine seepage, and little sticking to the box.

Figure 8:
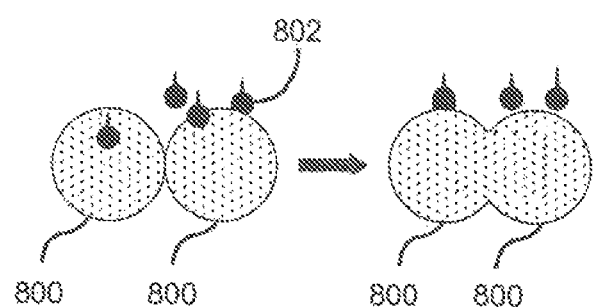
FIG. 8 depicts the clumping action of composite absorbent particles according to a preferred embodiment.
Figure 9:
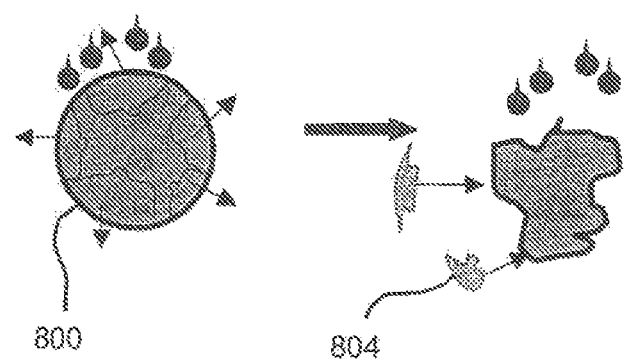
FIG. 9 depicts disintegration of a composite absorbent particle according to a preferred embodiment.

While not wishing to be bound by any particular theory, the increased clump strength is believed to be due to at least some of the PAC-containing granules "falling apart" and releasing their bentonite particles to reorder themselves, and this 'reordering' produces a stronger clump. As shown in FIGS. 8 and 9, this can best be described as a disintegration of more-water-soluble pieces of the agglomerated composite particles 800 when in contact with moisture 802, allowing the pieces 804 of the particles to attach to surrounding particles. This "reordering" produces a stronger clump. In testing, the visual appearance of the cores is a signal that at least some of the granules decompose to smaller particles, and these particles are "suspending" in the urine and are free to occupy interstitial spaces between particles, forming a stronger clump. This creates a network of softened agglomerated particles where broken particle pieces are attaching to others and creating a web of clumped material. Note however that the particles described herein should not be limited to clumping or scoopable particles.

As mentioned above, the composite absorbent particles have particular application for use as an animal litter. The litter would then be added to a receptacle (e.g., litterbox) with a closed bottom, a plurality of interconnected generally upright side walls forming an open top and defining an inside surface. However, the particles should not be limited to pet litters, but rather could be applied to a number of other applications such as:

Litter Additives—Formulated product can be pre-blended with standard clumping or non-clumping clays to create a less expensive product with some of the benefits described herein. A post-additive product could also be sprinkled over or as an amendment to the litter box.

Filters—Air or water filters could be improved by either optimizing the position of actives into areas of likely contact, such as the outer perimeter of a filter particle. Composite particles with each subcomponent adding a benefit could also be used to create multi-functional composites that work to eliminate a wider range of contaminants Bioremediation/Hazardous/Spill Cleanup—Absorbents with actives specifically chosen to attack a particular waste material could be engineered using the technology described herein. Exemplary waste materials include toxic waste, organic waste, hazardous waste, and non-toxic waste.

Pharma/Ag—Medications, skin patches, fertilizers, herbicides, insecticides, all typically use carriers blended with actives. Utilization of the technology described herein reduce the amount of active used (and the cost) while increasing efficacy.

Soaps, Detergents, and other Dry Products—Most dry household products could be engineered to be lighter, stronger, longer lasting, or cheaper using the technology as discussed above.

Mixtures of Different Particles—The composite particles can be dry mixed with other types of particles, including but not limited to other types of composite particles, extruded particles, particles formed by crushing a source material, etc. Mixing composite particles with other types of particles provides the benefits provided by the composite particles while allowing use of lower cost materials, such as crushed or extruded bentonite. Illustrative ratios of composite particles to other particles can be 75/25, 50/50, 25/75, or any other ratio desired. For example, in an animal litter created by mixing composite particles with extruded bentonite, a ratio of 50/50 will provide enhanced odor control, clumping and reduced sticking, while reducing the weight of the litter and lowering the overall cost of manufacturing the litter.

Mixtures of Composite Particles with Actives—The composite particles can be dry mixed with actives, including but not limited to particles of activated carbon.

Additional Examples

Note that all percentages are in weight percent in the following examples.

Example 9

A composite particle includes:
about 90-99.5% sodium bentonite as the primary absorbent material
about 0.1-10% activated carbon added to the sodium bentonite as in particles 102-108 and 114 of FIG. 1
about 0-9.9% additional active Example 10

A composite particle includes:
about 90-99.5% sodium bentonite as the primary absorbent material
about 0.1-10% zeolite, crystalline silica, silica gel, activated alumina, activated carbon, a superabsorbent polymer, and mixtures thereof added to the sodium bentonite as in particles 102-108 and 114 of FIG. 1
about 0-9.9% additional active Example 11

A composite particle includes:
about 10-70% core material selected from zeolite, crystalline silica, silica gel, activated alumina, activated carbon, a superabsorbent polymer, and mixtures thereof
about 30-90% sodium bentonite surrounding the core
about 0.1-10% activated carbon added to the sodium bentonite as in particles 110-112 and 116 of FIG. 1
about 0-10% additional active

Example 12

A composite particle includes:
about 10-70% core material selected from zeolite, crystalline silica, silica gel, activated alumina, activated carbon, a superabsorbent polymer, and mixtures thereof
about 30-90% sodium bentonite surrounding the core
about 0.1-25% zeolite, crystalline silica, silica gel, activated alumina, a superabsorbent polymer, and mixtures thereof added to the sodium bentonite as in particles 110-112 and 116 of FIG. 1
about 0-10% additional active

Example 13

A composite particle includes:
about 10-70% core formed from agglomerated particles
about 30-90% sodium bentonite surrounding the core
about 0.1-25% zeolite, crystalline silica, silica gel, activated alumina, a superabsorbent polymer, and mixtures thereof added to the sodium bentonite as in particles 110-112 and 116 of FIG. 1
about 0-10% additional active

Example 14

An absorbent composition of multiple composite particles, each composite particle including:
optional 10-70% core
about 30-100% agglomerated absorbent material
about 0.1-10% active added to the absorbent material as in particles 102-116 of FIG. 1
about 0-10% additional active selected from an antimicrobial, an odor reducing material, a binder, a fragrance, a health indicating material, a color altering agent, a dust reducing agent, a nonstick release agent, a superabsorbent material, cyclodextrin, zeolite, activated carbon, a pH altering agent, a salt forming material, a ricinoleate, silica gel, crystalline silica, and mixtures thereof
where about 1-25% of the composite particles are colored for creating "speckles" in the litter

Example 15

An absorbent composition of multiple composite particles admixed with particles of sodium bentonite, including:
about 10-90% particles of swellable sodium bentonite clay particles, ~1.4 mm-0.3 mm (14×50 mesh), dried and crushed
about 10-90% composite particles, each composite particle including:
optional 10-70% core
about 30-100% agglomerated absorbent material
about 0.1-10% active added to the absorbent material as in particles 102-116 of FIG. 1
about 0-10% additional active selected from an antimicrobial, an odor reducing material, a binder, a fragrance, a health indicating material, a color altering agent, a dust reducing agent, a nonstick release agent, a superabsorbent material, cyclodextrin, zeolite, activated carbon, a pH altering agent, a salt forming material, a ricinoleate, silica gel, crystalline silica, and mixtures thereof
about 0-25% colored or white "speckles" in the litter (can be activated alumina, colored composite particles, etc.)

The activated alumina itself may include an embedded coloring agent that has been added during the fabrication of the activated alumina particles. The inventors have found that the odor absorbing properties of activated alumina are not significantly reduced due to the application of color altering agents thereto.

Additionally, activated alumina's natural white coloring makes it a desirable choice as a white, painted or dyed "speckle" in litters. In composite and other particles, the activated alumina can also be added in an amount sufficient to lighten or otherwise alter the overall color of the particle or the overall color of the entire composition.

Compositions may also contain visible but ineffective colored speckles for visual appeal. Examples of speckle material are salt crystals or gypsum crystals.

Example 16

An absorbent composition of multiple composite particles admixed with particles of sodium bentonite, including:
about 10-90% composite particles, each composite particle including:
optional 10-70% core
about 30-99.9% agglomerated absorbent material
about 0.1-10% active added to the absorbent material as in particles 102-116 of FIG. 1
about 0-10% additional active selected from an antimicrobial, an odor reducing material, a binder, a fragrance, a health indicating material, a color altering agent, a dust reducing agent, a nonstick release agent, a superabsorbent material, cyclodextrin, zeolite, activated carbon, a pH altering agent, a salt forming material, a ricinoleate, silica gel, crystalline silica, and mixtures thereof
about 0.01-50% particles of activated alumina dry mixed with the composite particles. Preferably, the activated alumina is present in the composition in an amount of about 0.01% to about 50% of the composition by weight based on the total weight of the absorbent composition. More preferably, the activated alumina is present in the composition in an amount of about 0.1% to about 25% by weight.

Example 17

An absorbent composition (clumpable or nonclumpable) with improved odor control includes:
about 0.1-25.0% activated alumina and/or zeolite and/or silica particles
about 0-75% additives
to 100% composite particles as in particles 102-116 of FIG. 1

Example 18

An absorbent composition with antimicrobial benefit includes:
about 0.5-5.0% activated alumina and/or zeolite and/or silica particles [odor control]
about 0.001-1.0% borax pentahydrate [antimicrobial]
about 0.001-10% fragrance
about 0-25% additional additives
to 100% composite particles as in particles 102-116 of FIG. 1

Example 19

A clumping absorbent composition with antimicrobial benefit includes:

about 2% colored activated alumina and/or zeolite and/or silica particles, 1-2 mm (10×18 mesh)
about 0.5% borax pentahydrate [antimicrobial]
about 0.71% spray-dried fragrance—sprayed onto starch beads and mixed in
about 96.79% composite particles as in particles 102-116 of FIG. 1, ~1.4 mm-0.3 mm (14×50 mesh), dried and crushed Example 20

The following composition provides the benefit of improved odor control throughout the litter due to the varying densities of zeolite, activated, alumina, and silica gel.

An absorbent composition that is either clumpable or nonclumpable includes:
about 0.001-25.0% zeolite particles
about 0.001-25.0% activated alumina particles
about 0.001-25.0% silica gel particles
about 0-50% additives
to 100% composite particles including sodium bentonite clay as in particles 102-116 of FIG. 1

The zeolite is the heaviest of the three odor-absorbing materials, alumina is in the middle, and silica gel is the lightest. Because of the tendency of the materials to segregate upon agitation such as a cat digging in the litterbox, the zeolite, being heavier, will tend to move towards the bottom of the litter, while the lighter silica gel will tend to migrate towards the top of the litter. Thus, the litter will contain odor controlling actives throughout. An additional benefit is that the silica gel tends to repel liquid running across it, making it the ideal material for the upper layer of litter, as it will not immediately become saturated by animal urine but will retain its odor absorbing properties.

Also, by adding a lighter material such silica (25 lbs/ft$^3$) or zeolite (about 50 lbs/ft$^3$), the overall weight per volume unit of the mixture is reduced.

For clumping litter not relying on binders for clump strength, the total content of zeolite, activated alumina, and silica gel particles is preferably less than about 25% so that the clay provides satisfactory clumping performance.

Example 21

In a variation of Example 20:
An absorbent composition that is either clumpable or nonclumpable includes:
about 0.001-25.0% activated alumina particles
about 0.001-25.0% zeolite particles
about 0-50% additives
to 100% composite particles as in particles 102-116 of FIG. 1

Example 22

In a variation of Example 20:
An absorbent composition that is either clumpable or nonclumpable includes:
about 0.001-25.0% zeolite particles
about 0.001-25.0% silica gel particles
about 0-50% additives
to 100% composite particles as in particles 102-116 of FIG. 1

Example 23

In a variation of Example 20:
An absorbent composition that is either clumpable or nonclumpable includes:
about 0.001-25.0% activated alumina particles
about 0.001-25.0% silica gel particles
about 0-50% additives
to 100% composite particles as in particles 102-116 of FIG. 1

Example 24

A flushable and clumping absorbent composition with improved odor control includes:
about 0.1-25.0% activated alumina and/or zeolite and/or silica particles
about 0-75% additives
less than about 1% of a water soluble binding agent
to 100% composite particles as in particles 102-116 of FIG. 1

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:
1. A process for forming an animal litter containing a plurality of porous composite particles and a plurality particles of a liquid-absorbing material, said process comprising the steps of:
   a) forming composite particles by sequentially carrying out the following steps (i)-(iv):
      (i) introducing bentonite and powder activated carbon (PAC) into a pan agglomerator, a pin mixer or a Pelligrini mixer/Muller agglomerator combination;
      (ii) mixing the bentonite and PAC and optionally up to 20 weight percent water in the pan agglomerator, pin mixer or Pelligrini mixer/Muller agglomerator combination to form a plurality of bentonite-based porous composite particles wherein at least a portion of the PAC is encapsulated within the pores of the composite particles;
      (iii) drying the porous composite particles;
      (iv) sieving the porous composite particles to a predetermined particle size range suitable for use as an animal litter;
   b) combining the composite particles with a plurality of particles of a liquid-absorbing material of a predetermined particle size range suitable for use as an animal litter, to form an animal litter.

2. The animal litter formed by the process recited in claim 1, wherein the PAC is present in 0.1% to 5%.

3. The animal litter formed by the process recited in claim 1, wherein the PAC is present in 0.3% to 1.5%.

4. The animal litter formed by the process recited in claim 1, wherein the bentonite is sodium bentonite.

5. The animal litter formed by the process recited in claim 1, wherein the bentonite has a mean particle diameter of about 25-150 μm.

6. The animal litter formed by the process recited in claim 1, wherein at least 80% of the porous composite particles formed in step (iv) fall within said predetermined particle size range.

7. The animal litter formed by the process recited in claim 1, wherein the clump strength, an indication of the percentage of particles retained in a clump after six hours upon addition of liquid, of the animal litter formed is greater than 75%.

8. The animal litter formed by the process recited in claim 1, wherein the clump strength, an indication of the percentage of particles retained in a clump after six hours upon addition of liquid, of the animal litter formed is greater than 90%.

9. The animal litter formed by the process recited in claim 1, wherein the predetermined particle size range is 12×40 mesh (1650-400 microns).

10. The animal litter forming by the process recited in claim 1, wherein the liquid-absorbing material is clay.

11. The animal litter formed by the process recited in claim 10, wherein the clay is bentonite.

12. The animal litter formed by the process recited in claim 11, wherein the bentonite is sodium bentonite.

* * * * *